United States Patent [19]

Scheible

[11] Patent Number: 4,801,800

[45] Date of Patent: Jan. 31, 1989

[54] RADON COLLECTION APPARATUS AND METHOD

[76] Inventor: James N. Scheible, 2013 Park Rd., NW., Washington, D.C. 20010

[21] Appl. No.: 91,589

[22] Filed: Aug. 31, 1987

Related U.S. Application Data

[63] Continuation-in-part of Ser. No. 937,335, Dec. 3, 1986, abandoned.

[51] Int. Cl.$^4$ .............................................. G01V 5/00
[52] U.S. Cl. .................................. 250/255; 73/863.21
[58] Field of Search ........................ 73/863.21, 863.03; 250/435, 364, 255, 472.1, 430, 432 R, 432 PD; 55/66, 270; 422/88

[56] References Cited

U.S. PATENT DOCUMENTS

| | | | |
|---|---|---|---|
| 4,017,731 | 4/1977 | Howell et al. ...................... | 250/253 |
| 4,055,762 | 10/1977 | Durkin ................................. | 250/364 |
| 4,069,701 | 1/1978 | Baldauf et al. ...................... | 73/1 G |
| 4,185,199 | 1/1980 | Droullard et al. .................. | 250/364 |
| 4,208,912 | 6/1980 | Baldeck ............................... | 73/863.21 |
| 4,235,098 | 11/1980 | Tisch ..................................... | 55/270 |
| 4,277,259 | 7/1981 | Rounbehler et al. ............. | 73/863.21 |
| 4,343,177 | 8/1982 | Carlon et al. ....................... | 73/1 G |
| 4,350,507 | 9/1982 | Greenough et al. ................. | 55/270 |
| 4,481,297 | 11/1984 | Zucal et al. ....................... | 73/863.21 |
| 4,527,953 | 7/1985 | Baker et al. ........................ | 417/38 |
| 4,700,070 | 10/1987 | Kovac ............................... | 250/472.1 |

FOREIGN PATENT DOCUMENTS

| | | | |
|---|---|---|---|
| 1237080 | 10/1986 | Japan .................................. | 250/435 |
| 0966540 | 10/1982 | U.S.S.R. ........................... | 73/863.21 |

*Primary Examiner*—Stewart J. Levy
*Assistant Examiner*—Robert R. Raevis
*Attorney, Agent, or Firm*—Joseph J. Zito

[57] ABSTRACT

An apparatus utilizing an activated charcoal collector and a forced air system to provide a sufficient quantity of air to saturate the collector within a significantly short period of time. Mechanically dried activated charcoal particles are exposed to ambient air in order to saturate the particles with radon gas. Radon gas particles adhere to the surfaces of the activated charcoal particles through the action of Van der Waals forces. The charcoal particles are subsequently analyzed in a photospectrometer to determine the rate of discharge of radon decay by-products (progeny) emanating from the charcoal. The apparatus of the present invention, through utilization of a forced air system, reduces the charcoal-saturation exposure time to a small fraction of the exposure time necessary for prior mesurement techniques.

5 Claims, 1 Drawing Sheet

RADON COLLECTION APPARATUS AND METHOD

CROSS REFERENCE TO RELATED APPLICATIONS

This Application is a Continuation in Part of Ser. No. 937,335, filed Dec. 3, 1986 now abandoned.

BACKGROUND OF THE INVENTION

The present invention relates to radon gas concentration level measurement. More specifically, the present invention relates to radon gas sample collection methods for producing representative gas samples for subsequent analysis.

Radon gas, which is a radioactive decay by-product of radium, constantly seeps from subterranean radium deposits and out through the surface of the earth's crust, into the atmosphere surrounding the earth.

Significant concentrations of radon gas have been shown to pose possible health threats to people. Radon gas, in concentrations above four pico-curies per liter, (4 pCi/l) has been statistically shown to increase the risk of cancer in individuals exposed to such concentration levels. Since radon gas has a relatively short half-life, in the order of four days, the radon gas concentration never reaches significant levels upon escaping into the earth's atmosphere. Without confinement, radon gas does not reach sufficient concentration levels to pose a human health hazard.

Recently, however, radon gas has begun to pose a human health problem. If an enclosed structure, such as a dwelling, or office building, is placed over an area of radon effluence, the radon can seep into the structure through cracks or other openings in parts of the foundation or other parts of the structure that are in contact or near contact with the earth below the structure. If the structure is well-ventilated, radon concentrations still will not develop to sufficiently high levels to pose a human health hazard. However, with the advent of modern insulation techniques, and with the current considerations given to fuel and energy efficiency, most modern buildings are sufficiently weathertight so as not to permit a free exchange of interior and exterior air. This lack of air exchange can cause significantly increased radon concentrations to develop within a building.

At present, no reliable geological techniques are available for prediction of high concentrations of radon gas, or high concentrations of underground radium deposits. It is equally impossible to predict the extent of radon seepage into a building prior to construction. Therefore, it is necessary to measure actual radon level concentrations within a structure after construction has been completed to the extent that the structure is sealed against free air exchange.

At present, many techniques are available for measurement of radon concentration levels within closed atmosphere conditions. The Environmental Protection Agency (EPA) has developed measurement protocols for seven measurement systems. The advantages and disadvantages of those systems is reviewed in the EPA publication, "Radon/Radon Progeny Cumulative Proficiency Report" (EPA-No. 5201/1-86-008), incorporated herein by reference. The seven tested measurement systems include, alpha track detectors, charcoal canister gas collectors, continuous radon gas monitors, continuous working level monitors, grab radon gas sampling, grab working level sampling and radon progeny integrated sampling. The most common testing method offered by laboratories participating in the EPA testing is the "charcoal canister" method, wherein a mechanically-dried quantity of activated charcoal a material having a high surface-area-to- weight ratio, is passively exposed to the radon-containing atmosphere for a set extended period of time. The charcoal then becomes partially saturated with radon gas. The charcoal canister is then placed in a photospectrometer and the natural radioactive decay products of the radon gas trapped in the charcoal, are measured. Based upon the rate of production of decay products of radon gas, a determination is made as to the concentration of radon gas to which the charcoal has been exposed.

Other methods, such as a continuous radon monitor or a continuous working level monitor, can give a continuous real time indication of present radon levels within the atmosphere to which these devices are exposed. These devices are considerably more expensive, cumbersome and complicated to use than an activated charcoal collector.

SUMMARY OF THE INVENTION

The devices and methods currently available for radon concentration level testing are utilized to varying degrees of effectiveness in satisfying present needs for radon level detection. A new emerging need for reliable, inexpensive and quick testing which can be performed with minimal training has only just begun to be recognized by the radon measuring industry. The present invention teaches the recognition of and solution for this need.

Prior to the present invention, only the homeowner presently occupying a dwelling who is willing to maintain the optimum test conditions of a sealed house over a prolonged period of time is able to obtain an accurate measure of radon concentration levels. This situation has excluded individuals such as prospective home buyers from performing accurate radon level measurement. The radon testing industry has failed to recognize this need because of their reliance on the assumption of well-controlled testing conditions maintained by individuals interested in accurate measurement results. However, the industry has perceived a desire for a generally quicker test, but has been unable to provide such a test without the attendant complexity and cost.

The prior art has failed to recognize the need for minimal-time sampling techniques because of the present widespread, common and apparently adequate use of charcoal canister sampling techniques in the three-to-seven day rage. The three-to-seven day range has gained widespread acceptance because it is inexpensive and inherently reliable and accurate when utilized by individuals monitoring their own dwellings. As more and greater need for accurate and reliable radon level testing enters the home sale market, the reliability of proper test conditions becomes a greater concern.

Often sale contracts in real estate are time dependent. In a market with limited land and buildings, an evaluation of a potential purchase must often be made in a time period significantly shorter than presently necessary for radon concentration measurement by available techniques. Inspection of a building prior to purchase is executed by any prudent purchaser and often required by a lender. All other standard and routine inspection aspects can be accomplished in a fraction of the time required for radon analysis by presently available methods. Therefore, inspections prior to the advent of radon contamination concerns were completed within the time constraints imposed by a limited market. With the development of radon hazards through increasingly weathertight structures, and with increased radon awareness, a complete inspection must now include radon sampling. Prior to the present invention, time-contingent purchasers did not have the ability to analyze radon concentrations, and therefore sales had to be consummated based upon incomplete information.

Heretofore the problem has remained unrecognized by the art. Methods for faster sample collection, such as continuous radon monitoring or continuous working level monitoring, require costly and complicated equipment requiring a great deal of skill and training for proper operation. The results of such tests are of course not as reliable as activated carbon saturation tests, therefore making the test now possible by the present invention both more reliable and desirable than prior art techniques. The present invention possesses the ability to perform short-term sampling under strictly controlled conditions without the extent of training and without the inherent inaccuracies of the more complicated and tenuous measuring systems.

If the testing conditions cannot be maintained by the individual interested in the results, then any testing method will provide inaccurate data. This heretofore unrecognized inherent problem of present radon testing techniques is addressed by the present invention. A prospective home buyer utilizing current charcoal canister sample collection methods has little control of test parameters. The present invention enables an individual to collect an adequate sample in a minimal amount of time, thereby allowing collection under known conditions.

The teachings of the invention further enable the establishment of widespread testing under known controlled conditions with a minimum of time per test site, thereby allowing a maximum utilization of resources.

Several disadvantages are inherent in a measurement/collection device which must be left unattended for three to seven days. A large number of variable conditions can be altered or may inherently change in the structure being analyzed during the three-to-seven day period. The building may have remained closed prior to the beginning of the sampling and then may be opened or aired out during the sampling process, thereby giving an inaccurate reading of the closed house conditions and resultant radon level concentrations. Atmospheric conditions, not within the control of any of the individuals involved in the measuring or testing, can also have a profound influence on the results of sampling.

The charcoal canister could be covered during sampling, and thereby not exposed to the actual radon concentration of the building during the testing period, thereby yielding an inaccurate radon concentration level reading because the charcoal has not had the opportunity to saturate with the radon gas contained in the surrounding environment.

The present invention introduces the forced air collection method providing improved accuracy and reliability while substantially reducing collection time. Forced Air Collection, taught by the present invention, solves existing and unrecognized problems inherent in passive collection.

The present invention teaches an improved collection and analysis method utilizing a charcoal canister for radon level detection. The present invention drastically reduces the amount of time necessary to take an accurate sampling of ambient air within a dwelling structure. Charcoal canisters, under currently known and practiced passive collection methods, need to be deployed for three to seven days within the environment from which the air is sampled, and then only reach a 50% saturation level. This time period is necessary to get a proper activated charcoal saturation with radon gas under prior sampling techniques. Due to the approximately 3.8-day half-life of the radioactive components of radon, the saturation level achieved by a canister cannot reach a fully concentrated saturation level.

The advantages of the charcoal canister method of collection include its precise results which can be obtained upon proper analysis of the saturated charcoal. The present invention replicates the precise results without need for the canister to remain exposed for days in the environment under test.

In order to avoid these potential problems from either environmental, intentional or unavoidable alternations of test conditions, the present invention allows a much quicker and more controlled sampling method.

It is an object of the present invention to provide a means for radon level detection which is fast, efficient, accurate and easy to use.

It is another object of the present invention to provide a means for radon detection, which allows on-site ready collection of an atmospheric sample in a minimally-short period of time.

It is a further object of the present invention to provide a radon level detection means which cannot be defeated through improper exposure, intentionally or accidentally over a prolonged period of time.

DETAILED DESCRIPTION OF A PREFERRED EXEMPLARY EMBODIMENT OF THE PRESENT INVENTION

Figure 1:
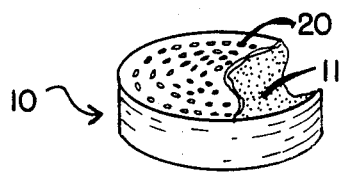
FIG. 1 is a cutaway view of a charcoal canister utilized for collection of radon gas.

The present invention utilizes a charcoal-filled canister 10 as illustrated in FIG. 1. Such canisters are available from the Mine Safety Appliances Company of Pittsburgh, Pennsylvania. The charcoal canister is very similar to the canisters now utilized in three-to-seven day passive sampling techniques. The canister 10 contains activated charcoal 11 which has been purged of organic vapors and upon utilization of the present invention becomes saturated with atmosphere from within the dwelling to be monitored. The canister has openings 20 in its upper surface and lower surface which permit free flow of air.

Figure 3:
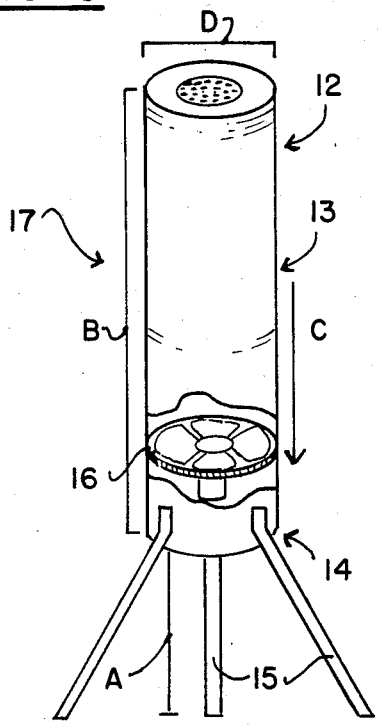
FIG. 3 is a side view of the present invention.
Figure 2:
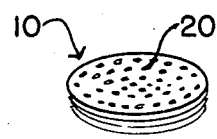
FIG. 2 is a partial view illustrating the mounting of a charcoal canister in the end of the body portion of the present invention.

As illustrated in FIG. 2 the canister either snaps or is threaded into the top end 12 of the main body portion 13 of the present invention. The lower end 14 of the main body portion 13 of the present invention, as illustrated in FIG. 3 is maintained a minimal distance "A" above ground level, by legs 15. In the preferred exemplary embodiment the main body portion is preferably thirty inches in length "B" and has its lower end 14 maintained twelve inches "a" above ground level. The flow rate of air through the body 13 in the direction of arrow "C" of the preferred embodiment is between 200 and 2,000 cubic feet per minute. Therefore, the minimal distance "A" of twelve inches is necessary to prevent return flow of the air, which has passed through the tube, from being redrawn into the upper end 12 of the body 13.

The cylindrical body 13 in the preferred embodiment has a cross-sectional diameter 'D' of six inches. These dimensions allow for a smooth flow of the preferred cubic feet per minute of air while maintaining the velocity sufficiently low as not to cause significant disturbance of the air, so that unnatural air currents or convection patterns are not created within the environment or dwelling being monitored.

A second embodiment of the present invention, which has yielded similarly accurate results but is more compact in design, is also utilized for sampling. This second embodiment is configured, as illustrated in FIG. 3; however, the body 13 is only 3 inches in diameter D and 10 inches in length B. The collector is spaced between 22 and 26 inches from ground level, and has a flow rate between 18 and 1,000 cubic feet per minute of air.

The flow rate must be sufficiently rapid for proper sampling for a number of reasons. A proper flow rate will ensure that a sufficient quantity of air passes through the canister 10 within a minimal amount of time. The volume of air is necessary to ensure that the charcoal 11 is saturated and to ensure that the sample taken is representative of the air within the dwelling.

A fan 16 is mounted within the main body housing, 13 to provide the necessary flow rate, in order to saturate the activated charcoal 11 contained within the charcoal canister 10 in a minimal amount of time. The preferred embodiment of the present invention, as herein disclosed, is able to saturate the charcoal 11 within the canister 10 within a matter of one hour. Numerous tests, run on devices constructed within the teachings of the present invention, have provided results which satisfy the accuracy, consistency and reliability guidelines established for the EPA protocol of the above-cited EPA publication.

By utilization of the present invention in combination with a charcoal canister, an operator of the present invention is able to take an accurate radon level sampling within a significantly-reduced period of time. This period of time, in the order of one hour, greatly reduces any inherent errors which may result from changing conditions, either accidental or intentional, which are inherently experienced in a three-to-seven day waiting period for normal charcoal canister sampling techniques.

In order to obtain the desired gas sample, the present invention is positioned in he location within the building where radon concentration is likely to be at a maximum. This will normally be the basement or lower floor of the structure. The charcoal canister 10 is placed into the upper opening 18 in the top end 12 of the device. The openings 20 in the upper and lower surface of the canister 10 are not blocked to allow air passage through the canister.

The fan 16 is then activated by supplying electricity thereto, either from a common wall outlet or from a battery source. The fan 16 can be driven by either an AC or DC powered motor without departing from the scope of the invention.

After an appropriate period of time has elapsed during which a sufficient volume of air flow has been maintained through the tube 13, the canister 10 is removed from the collector top opening 18 and the openings 20 in the canister are sealed to prevent further air flow through the canister 10 during handling. The charcoal 11 within the canister 10 is then analyzed to determine the concentration of radon gas within the atmosphere which has saturated the charcoal 11. The analysis can be performed by photospectrometry or any other desired analysis technique for measurement of radon or radon progeny concentration levels.

The procedure detailed below is the preferred method for analysis of samples collected, utilizing the above-described apparatus and procedure taught by the present invention. Prior to atmospheric sampling, the charcoal canister collector is prepared. The canister utilized preferably contains cleansed charcoal, free from extraneous contaminants which may skew the test results or impede the ability of the charcoal to absorb radon gas. Preparation of the canister includes heating of the cartridge and charcoal to 120 degrees centigrade for sixteen hours in order to dry and activate the charcoal. The charcoal and canister are then cooled to a handling temperature and placed in a polyethylene bag of approximately 0.00115 inches thickness. The bag is sealed in order to prevent exposure of the charcoal.

The bag and the cartridge containing the charcoal are then weighed together to an accuracy of plus or minus 0.1 grams. The total weight is recorded for later comparison. At this point, if the cartridge is to be shipped or stored for a period of time greater than three days, the cartridge and bag are placed within a thicker polyethylene bag of approximately 0.0027 inches and sealed for storage.

After cartridge preparation, the sampling process may be begun as described below. The sampler 17, as illustrated in FIG. 3, is first placed in an appropriate location for collection in accordance with EPA suggested sampling protocol.

Next, the cartridge 10 is removed from its sealed polyethylene bag and placed into the upper end of the sampler 12, as illustrated in FIG. 2. The fan 16 is then activated to begin the sampling process by forcing air through the body 13 of the sampler.

After the fan 16 has run for a period of time sufficient to saturate the charcoal 11 within the canister 10, the fan is deactivated. The canister 10 is then removed from the upper end of the body 12 and returned to its sealed plastic polyethylene bag. The exact time and date of deactivation and removal is noted for use in calculations in analysis of the sample.

The sampling process is thereby completed, an the charcoal canister 10 is ready for analysis. At this point, the charcoal 11 within canister 10 is saturated with radon gas to a concentration level indicative of the concentration level of the ambient atmosphere from which the sample was taken.

The first step in analysis of the sample is to again weigh the cartridge 10 and its polyethylene bag which were weighed during the preparation prior to the sampling. The post-sampling weight is then recorded to an accuracy of ±0.1 grams.

The cartridge is then analyzed using the standard analysis techniques for detection of radon decay progeny. The bag and cartridge are placed in the bottom of a three-inch diameter ointment can. The can is then placed on a three-inch by three-inch NIA detector. The volume of radioactive decay is counted for fifteen minutes and noted. This provides a raw count number for determination of radon gas concentration. The raw count, itself, is mainly representative of the number of radioactive by-products of decay, which were detected by the NIA detector and counted.

After a raw count is obtained, the raw count number is converted into an empirical value indicative of the radon gas concentration in the test sample. Various formula standardization factors on calibrations are utilized by different testing laboratories, dependent upon their equipment, measurement conditions and measurement procedures, as well as other factors. An example of the analysis technique utilized by an EPA-recognized testing laboratory, which is representative of industry standard, is given below. Appropriate calibration tests, utilizing samples compared to standards or other techniques yielding known results, would need to be performed to determine the calibration and/or correction factors for conversion of raw count to pCi/1 when measurement is performed by other laboratories.

The total count gained over the fifteen-minute interval is then converted into a pico-curie per liter (pCi/1) volume, utilizing the following formula.

$$pCi/1 = \frac{(\text{total count} - \text{background count}) e^{\lambda \Delta t}}{15 \text{ minutes } (\beta)} (CYC) \quad (1)$$

where: $\lambda = 0.693/3.825$
$\Delta t$ = time lapse between sample end and beginning of count.
CYC = Counter yield correction factor dependent on the ratio of the yield of the individual counter to the yield of a standard counter.

$\beta$ = conversion factor of:

$$38.1 - 2.7(W_2 - W_1) \frac{c/m}{pCi/1}$$

$W_2$ = weight after collection
$W_1$ = weight before collection

This is the standard analysis formula utilized to yield a pseudo-concentration of radon gas under normal passive collection sampling techniques. If a canister which has been utilized in the forced air sampling technique herein disclosed is analyzed in this manner, the pseudo-concentration result is then further converted to get the pseudo-concentration result for forced air sampling, as herein taught. The conversion is accomplished by multiplying the pseudo-concentration in pico-curies per liter found from the above equation by 0.84 and subtracting 0.11 pico-curies per liter (pCi/1) from the result.

$$2 \ (pCi/1)_{Final} = [(pCi/1)_{Initial}(0.84)] - 0.11 \quad (2)$$

This calibration was derived from comparison of concurrently exposed canisters, where the forced air sample is obtained during the final hour of the lengthy exposure time of a passively exposed canister. Both canisters are then analyzed by the same laboratory and the conversion equation (2) is derived to equilibrate the raw count of both samples. In this way the forced air collection is in conformance with the accepted measurement techniques based on currently accepted scientific theory of radon concentration measurement.

As described above, these factors are exemplary of the calibration/correction necessary for one lab representative of industry standard, and may vary from lab to lab, but are readily derivable through the performance of a test calibration series at the desired laboratory.

Figure 4:
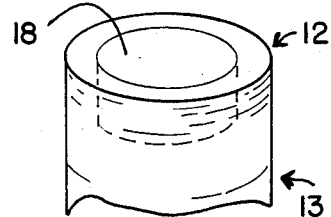
FIG. 4 is a graph illustrating data analysis comparison of the present invention and prior art collection methods.
Figure 4:
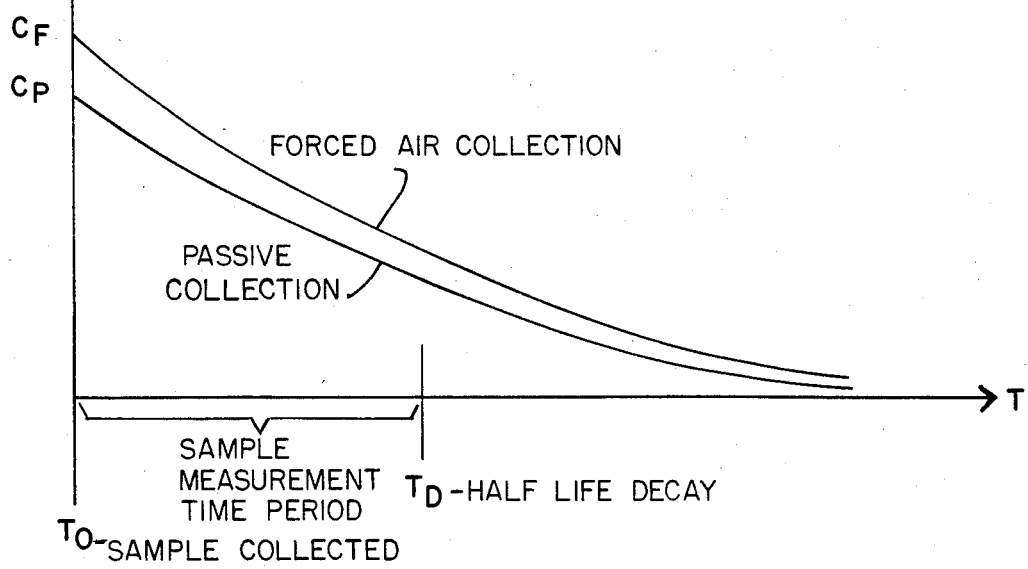

The reason for the difference in sample analysis, between the forced air and the passive collection methods, is illustrated in the diagram of FIG. 4. The concentration of a sample obtained through the passive collection method $C_p$, in terms of raw radioactive count, is assumed to contain approximately half of the concentration of the sampled environment. This is termed the "50% equilibrium concentration", and is based on a number of assumptions accepted in the radon gas measurement and testing industry. For the purposes of obtaining a numerical value indicating radon concentration, it is generally assumed that approximately half of the radon gas present is lost prior to or during collection through plating on walls or other surfaces.

The sample obtained through the forced air collection $C_f$ aught by the present invention represents a higher equilibrium concentration of the radon from the environment being sampled. The radioactive by-product of both collection samples decays from the initial raw count $C_p$ or $C_f$ at $T_0$ to approach zero. The sample must be measured within four days of collection to insure that the radon progeny level is measured before the end of a time period, 3.8 days, equal to the half-life decay time $T_D$ of the radon progeny.

It can therefore be seen that the relationship between the raw count measure from passive collection and forced air collection maintains a constant relationship over the elapsed time since collection. Immediately after collection the final pCi/1 level derived from the forced air collection is approximately 19% greater than that of passive collection and after the lapse of the decay time half-life $T_D$ the forced air is still approximately 19% greater than the level obtained from passive collection. Analysis of the sample, therefore, must take into consideration the elapsed time since the termination of sampling. The raw count imperical difference between passive and forced collection is, therefore, time dependent, the percent of difference remains constant, however, so that when equation (1) is solved, the pCi/1 value is 19% greater for forced than passive collection at any point in the analysis time period.

Table 1 below shows typical radon concentration samples obtained through utilization of the forced air technique, as herein taught, compared with monitored radon levels in a controlled environment. These tests were performed at the Arden Test Facility of the Environmental Protection Agency, located in Arden, NV. The first column contains the numerical designation of the cartridges used for each sample. The second column indicates the pseudo-concentration obtained through utilization of the formula for calculating pseudo-concentration, equation (1), given above. The third column indicates the actual concentration level after correction of the result of equation (1) to correct for the variance in collection techniques as described above (2). The numbers in the third column are, therefore, the actual measured radon concentration in pico-curies per liter (pCi/1) obtained from the forced air sampling technique, as herein taught. The fourth column indicates the radon concentration level as detected by the Luca Cell monitoring device utilized by the EPA in their controlled environment test site. The fifth column indicates the measured radon level obtained through the utilization of the EPA Continuous Monitor at their controlled test site. The sixth column indicates the variance between the corrected sample concentration and the Luca Cell concentration. The seventh column indicates the variance in percentage between the forced air sampled concentration and the Continuous Monitor concentration level. Due to the difference in the Luca Cell and Continuous Monitor indicated radon concentration levels, the eighth column has been added to indicate the average variance of the present forced air grab sampling technique between the two monitored levels. An average of the variants across the twelve samples herein illustrated in Table I is given at the bottom of Table I.

As can be seen from the data in Table I, the forced air sampling technique, as herein taught, provides results well within the twenty-five percent test guidelines prescribed by the Environmental Protection Agency. The test results, obtained under monitored controlled conditions provided through the Environmental Protection Agency's Arden Test Facility and at the EPA's Montgomery, Alabama Controlled Test Chamber, demonstrate that the results obtained through the forced air collection technique as herein taught provide accurate and consistent measurements of radon concentration levels.

The Arden Test Facility is a controlled, monitored environment situated over a natural radon gas production site and it is utilized by the EPA for standardization of radon detection calibration and monitoring equipment. The Montgomery, Ala. Controlled Test Chamber (CTC) is utilized for conducting the proficiency rating tests to determine inclusion in the above-cited EPA publication. Testing of an embodiment of the present invention for such proficiency resulted in the creation of a new, accepted protocol.

The acceptance of the forced air method taught herein under EPA program guidelines as a new, acceptable measurement system, and its inclusion in the EPA Radon/Radon Progeny Cumulative Proficiency Report (EPA No. 520/1-87-015) July, 1987, confirms the consistency, accuracy, reliability and acceptance of the measurement technique of the present invention.

Further test data, demonstrating results acceptable for EPA protocol guidelines not included in Table I, are published in Radon/Radon Progeny Analytical Proficiency Report, Research Triangle Institute, July 1987.

time for the forced air techniques as herein taught. Through extensive test results, a one-hour sampling time has been determined to be the preferred time period. A shorter time period can also yield acceptable results. A time period exceeding one hour is acceptable and will yield the same results as an hour sampling. However, after one hour, the radon gas concentration level within the collection canister has stabilized, and therefore, further collection is not necessary. The preferred one-hour collection time for canisters and collection apparatus as dimensioned and described above is preferred, but may vary dependent on a variety of factors.

If a canister of a different size or a different flow rate is utilized, the collection time is varied correspondingly. It can be seen that if a canister of a different size or cross-sectional area or configuration is utilized, a different flow rate may be necessary and therefore a different time period of collection may yield the optimal results. Also, if charcoal of varying size, shape or surface area-to-weight ratio is utilized, the time period and/or flow rate for collection may be altered. Also, if a collection medium other than charcoal is utilized, exposure time may be varied accordingly.

TABLE 11

| Sample Time Comparison | |
|---|---|
| Exposure Time | Measured Concentration |
| 30 | 5.7 |
| 45 | 5.0 |
| 60 | 5.3 |
| 75 | 5.0 |
| 120 | 5.1 |
| 180 | 5.2 |

The canisters utilized to obtain results shown in Table I were all simultaneously exposed to a single radon-containing environment during a three-hour time period for varying lengths of collection/exposure time within that three-hour time period. Therefore, the results obtained reflect a minimal amount of actual concentration level variation and show a definite stabilization of charcoal saturation at one-hour exposure time.

Because many varying and different embodiments may be made within the scope of the inventive concept herein taught, and because many modifications may be made in the embodiment(s) herein detailed in accordance with the descriptive requirements of the law, it is

TABLE 1

Comparison of Forced-Air Grab Sample with Monitored Radon Level

| Cart # | Pseudo Conc. pCi/l | Corrected pCi/l | Luca Cell pCi/l | Continuous Monitor pCi/l | Variance from Luca Cell | from C.M. | Ave. Var. |
|---|---|---|---|---|---|---|---|
| 34 | 5.24 | 4.29 | 4.56 | 4.33 | −5.9% | −0.9% | 3.4% |
| 37 | 5.02 | 4.11 | " | " | −9.9 | −5.1 | 7.5 |
| 45 | 5.31 | 4.35 | " | " | −4.6 | +0.5 | 2.0 |
| 50 | 5.45 | 4.47 | " | " | −2.0 | +3.2 | 0.6 |
| 33 | 5.51 | 4.52 | 4.23 | 4.25 | +6.9 | +6.3 | 6.6 |
| 47 | 5.58 | 4.58 | " | " | +8.3 | +7.8 | 8.0 |
| 48 | 5.24 | 4.29 | " | " | +1.4 | +0.9 | 1.1 |
| 49 | 5.24 | 4.29 | " | " | +1.4 | +0.9 | 1.1 |
| 35 | 4.46 | 3.64 | 4.25 | 4.05 | −14.4 | −10.1 | 12.2 |
| 36 | 5.24 | 4.29 | " | " | +0.9 | +5.9 | 3.4 |
| 46 | 4.68 | 3.82 | " | " | −10.1 | −5.7 | 7.9 |
| 51 | 5.02 | 4.11 | " | " | −3.3 | +1.5 | 0.9 |
| | | | | Average | 5.8 | 4.1 | 4.6 |

Table II illustrates a portion of the series of tests to determine the optimal desired and preferred sampling to be understood that the details herein are to be interpreted as illustrative and not in a limiting sense.

Once given the above disclosure, many other features, modifications and improvements will become apparent to the skilled artisan. Such features, modifications and improvements are thus to be considered a part of this invention, the scope of which is to be determined by the following claims:

What is claimed is:

1. A method for collection and analysis of a radon gas sample representative of the radon gas concentration within an environment, comprising the steps of;
   providing a housing with an air passageway therethrough, and having air moving means located within and gas collecting means positioned across said passageway,
   providing said gas collecting means with radon adsorbing particles,
   locating said housing within said environment to be sampled,
   activating said air moving means to draw air through said passageway and said gas collecting means to force-saturate said particles,
   isolating said particles from said environment, ,
   analyzing said particles to determine the quantity of radiation emitted therefrom,
   converting said radiation quantity into a number representative of the radon concentration within said environment,
   wherein said step of converting includes;
   utilizing a standard passively-saturated-particle radiation emission analysis formula appropriate to said particles to convert said radiation quantity to a first radon pseudo-concentration value, and
   adjusting said first pseudo-concentration value to reflect the increased radon adsorption by said force-saturated particles.

2. A method for collection and analysis of a radon gas sample representative of the radon gas concentration within an environment, comprising the steps of;
   providing a housing with an air passageway therethrough, and having air moving means located within and gas collecting means positioned across said passageway,
   providing said gas collecting means with radon adsorbing particles,
   locating said housing within said environment to be sampled,
   activating said air moving means to draw air through said passageway and said gas collecting means to force-saturate said particles,
   isolating said particles from said environment,
   analyzing said particles to determine the quantity of radiation emitted therefrom,
   utilizing a standard passively-saturated-particle radiation emission analysis formula appropriate to said particles to obtain radon pseudo-concentration value form said radiation quantity, and
   converting said pseudo-concentration value into a number representative of the radon concentration within said environment,
   wherein said step of converting includes utilization of the formula:

$$(pCi/1)_{Final} = ((pCi/1)_{Initial}(\delta)) + \alpha$$

where:
   $\delta$ and $\alpha$ are factors utilized to convert force-saturated particle exposure analysis measurements,
   $(pCi/1)_{Initial}$ represents said pseudo-concentration value, and
   $(pCi/1)_{Final}$ represents said number representative of the radon concentration within said environment.

3. The method of claim 2, wherein;
   the values of [s]$\delta$ and are dependent upon the analysis technique and equipment utilized.

4. A method for collection and analysis of a radon gas sample representative of the radon gas concentration within an environment, comprising the steps of;
   providing a gas collecting means having radon absorbing particles,
   providing air moving means for actively supplying air from said environment to be sampled to said gas collecting means, to force-saturate said particles,
   force-saturating said particles,
   isolating said particles from further radon exposure,
   analyzing said particles to determine said radon concentration within said environment,
   wherein said analysis includes;
   utilizing a standard passively-saturated-particle radiation emission analysis formula appropriate to said particles to determine a first radon pseudo-concentration value, and
   adjusting said first pseudo-concentration value to reflect the increased radon adsorption by said force-saturated particles.

5. A method for collection and analysis of a radon gas sample representative of the radon gas concentration within an environment, comprising the steps of;
   providing a gas collecting means having radon absorbing particles,
   providing air moving means for actively supplying air from said environment to be sampled to said gas collecting means, to force-saturate said particles,
   force-saturating said particles,
   isolating said particles from further radon exposure,
   analyzing said particles to determine said radon concentration within said environment,
   wherein said analysis includes;
   measuring the rate of emission of radio active decay by-products of a radon from said particles,
   utilizing a standard passively-saturated-particle radiation emission analysis formula appropriate to said particles to convert said radiation rate into a first radon pseudo-concentration value, and
   adjusting said first pseudo-concentration value to reflect the increased radon adsorption by said force-saturation of said particles.

* * * * *